United States Patent

[11] 3,616,014

[72] Inventor Walter Weglin
10758 22nd Ave. S.W., Seattle, Wash. 98160

[21] Appl. No. 729,346
[22] Filed May 15, 1968
[45] Patented Oct. 26, 1971

[54] MANUFACTURE OF PRINTED CIRCUIT BOARD
9 Claims, 7 Drawing Figs.

[52] U.S. Cl. .......... 156/228, 29/625, 264/272, 72/362
[51] Int. Cl. .......... B32b 31/04
[50] Field of Search .......... 72/363; 264/316, 322; 156/228; 29/625

[56] References Cited

UNITED STATES PATENTS

| | | | |
|---|---|---|---|
| 3,344,515 | 10/1967 | Schuster et al. | 29/628 |
| 1,911,765 | 5/1933 | Mathews et al. | 264/316 X |
| 2,390,803 | 12/1945 | Marschner | 264/316 X |
| 3,192,086 | 6/1965 | Gyurk | 29/625 UX |
| 3,348,990 | 10/1967 | Zimmerman et al. | 29/625 |
| 3,470,291 | 9/1969 | Johnson | 264/316 X |
| 3,473,993 | 10/1969 | Kepple et al. | 29/625 X |

FOREIGN PATENTS

| | | | |
|---|---|---|---|
| 1,160,037 | 2/1958 | France | 29/625 |

*Primary Examiner*—Reuben Epstein
*Attorney*—Christensen & Sanborn

ABSTRACT: A composite structure such as a printed circuit board is stacked back-to-back with a relatively yieldable backing in a press, and the stack is heated and compressed by applying a heated platen to the face of the structure on the opposite side thereof from the backing, so as to flatten the latter face while imparting a smooth unbroken contour to the strip-bearing face of the structure. Under the conditions of compression the backing is nonlaminable with the structure and after the compression step is relatively removed from the same.

INVENTOR.
WALTER WEGLIN

BY Christensen,
Sanborn & Matthews
ATTORNEYS

MANUFACTURE OF PRINTED CIRCUIT BOARD

FIELD OF THE INVENTION

This invention relates to the manufacture of composite structures such as printed circuit boards comprised of a pattern of foil strips bonded to an underlying base; and to certain composite structures resulting from such a manufacturing operation.

BACKGROUND OF THE INVENTION INCLUDING CERTAIN OBJECTS THEREOF

In the prior art, many processes were disclosed for manufacturing printed circuit boards, including the stamping processes disclosed in my copending application Ser. No. 500,820, with Charles Wildebour, of common assignment herewith, entitled Composite Structure and Method of Making the Same, filed on Oct. 22, 1965, now abandoned. However, few of these prior art processes produced a low-cost structure in which the circuit-bearing face of the base presents a smooth unbroken contour to the touch, although the embodiments in our above application employing an electrical press board or the like as the base were able to do so and at extremely low cost. By a face having "smooth unbroken contour," I mean one in which there is no abrupt change, such as the change produced by a "-trench" around the circuitry, or the change produced by an angular wall raised by the circuitry itself, or the change produced by both such features as in the case where the circuitry is only partly recessed into the face of the base. In particular, I have in mind a contour which will not snag or tend to snag an electrical "wiper" moving thereover, as for example in those instances where the printed circuit board is used as a switchplate or other fixed contact for a wiper.

One object of the present invention is to provide a process by which such a printed circuit board can be produced. Another object is to provide a process by which a board of this nature can be produced at low cost, such as at one-fourth to one-third the cost of boards produced by prior art techniques. Still another object is to produce and provide a board of this nature which can be manufactured not only with a smoothly contoured circuit-bearing face such as was described above, but also with circuitry thereon developed from extremely light gauge foil such as 1 and 2 ounce foil, and at extremely high strip counts per inch, such as 20 strips per inch, typically 0.050 inch on centers and at 0.025-inch insulative spacings. Other objects include the provision of a board of this nature which has a circuit-bearing face thereon that is easier to clean and less likely to gather and retain dirt and dust; and in which the circuitry is free of undercut at its outline edges, and has extremely high peel strengths such as 13 pounds or more. Other objects will be apparent from the description of the invention which follows hereafter.

SUMMARY OF THE INVENTION

These objects and advantages are realized by certain composite structures and techniques of my invention wherein after the pattern is bonded to the base, the composite structure is arranged in a stack back to back with a continuous uninterrupted layer of compressible die material, and the stack is compressed between a pair of rigid platens while applying heat thereto, so as to cause the base to undergo compression in the portions thereof disposed relatively opposite the strips of foil, without undergoing substantial lateral deformation in the portions thereof relatively surrounding the outline of the strips. In this way, the base and the pattern of strips are displaced in relation to one another so as to provide the foil-bearing face of the base with a smooth unbroken contour. The layer of die material is nonlaminable with the composite structure under the conditions of compression so that the layer and structure can be parted from one another thereafter. In the press operation, the layer of die material may be disposed back to back with the foil-bearing face of the base, in which case as a result the strips of foil are raised from the face of the board and convexly arcuate at the outline edges thereof so that the face of the board presents the desired contour to the touch of a finger. On the other hand, if the layer of die material is disposed back to back with the face of the board on the other side thereof, the strips are entirely flat and impressed in the base substantially flush with the face thereof so that it presents a smooth unbroken contour to the touch. The disposition of the circuitry in the original structure is immaterial in that it may have been fully raised from the face, or partly or fully recessed therein. In all cases the result is the same. Likewise, the process by which the original structure was manufactured is immaterial. For example, in the case of a structure in which the circuitry is fully raised, it may have been manufactured by an etching process or by one of the stamping processes disclosed in our above-mentioned application.

The choice of die material is also open to variation so long as the layer of die material is compressible during the pressing operation, to enable the portions of the base to act as described. For example, in my preferred operations, I employ electrical press board (Kraft pulp material) which is inherently compressible, although nondeformable. In other operations I may employ a material which is inherently pressure deformable such as rubber; or one which is rendered such during the pressing operation. The electrical press board is greatly preferred, however, because of its cheapness and ease of use.

The process is particularly applicable to resinous printed circuit boards, such as phenolic, polyester, and paper base and glass epoxy boards. Although these resinous materials are thermally set or cured in the manufacture of the composite, they nevertheless retain sufficient plasticity at temperatures of for example 250°–300° F., to undergo compression in the subsequent treatment to which I subject them in my process.

DESCRIPTION OF THE PREFERRED EMBODIMENTS

These features will be better understood by reference to the accompanying drawing which illustrates two embodiments of my press technique together with the products resulting therefrom.

Figure 1:
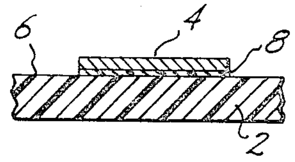
FIG. 1 is a cross-sectional view of a typical resinous circuit board with raised circuitry thereon.
Figure 2:
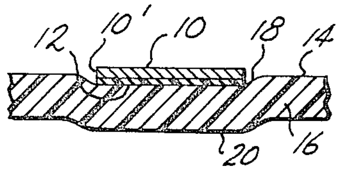
FIG. 2 is a similar view of a resinous circuit board in which the circuitry is partly recessed into the face of the board.
Figure 3:
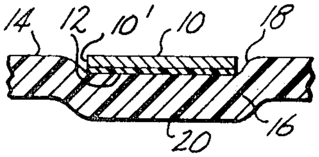
FIG. 3 is a similar view of a resinous board in which the circuitry is fully recessed into the face of the board so as to be flush therewith.

Referring to the drawing, it will be seen that the composite structure of FIG. 1 comprises a thin substantially rigid sheetlike resinous base 2 having a pattern of foil strips 4 bonded to the upper face 6 thereof by an adhesive layer 8. The base is typically 1/16-inch thick, and the foil is typically 1 or 2 ounce material. The circuit-bearing face 6 of the base is flat thereacross and the foil strips 4 are fully raised thereon. Such a composite structure might result from one of the stamping operations disclosed in our above application, or from one of the etch techniques disclosed elsewhere in the prior art. Note that the strips 4 would be likely to snag a wiper contact moved across the face 6 thereof. In FIGS. 2 and 3 the composite structure is that resulting from one of the other operations disclosed in our above application which produces a partly or fully recessed pattern of strips 10. In each instance the strips are recessed within indentations 12 in the face 14 of the base 16 and the outline edges 10 of the same are surrounded by "-trenches" 18 so that a wiper contact would tend to snag the strips as it moves across the face of the base. Also note that the base has convexly arcuate protrusions 20 relatively raised from the face on the other side thereof, at points opposite the strips.

Figure 4:
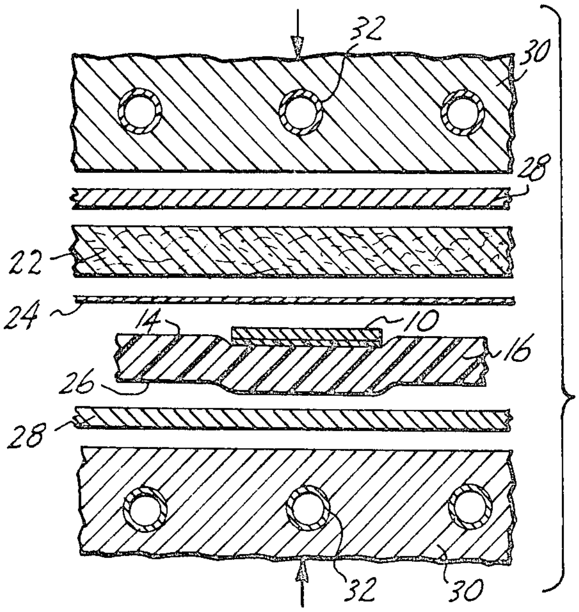
FIG. 4 is a schematic view of my press technique using the board of FIG. 2 and with the layer of die material disposed back to back with the circuit-bearing face thereof.
Figure 6:
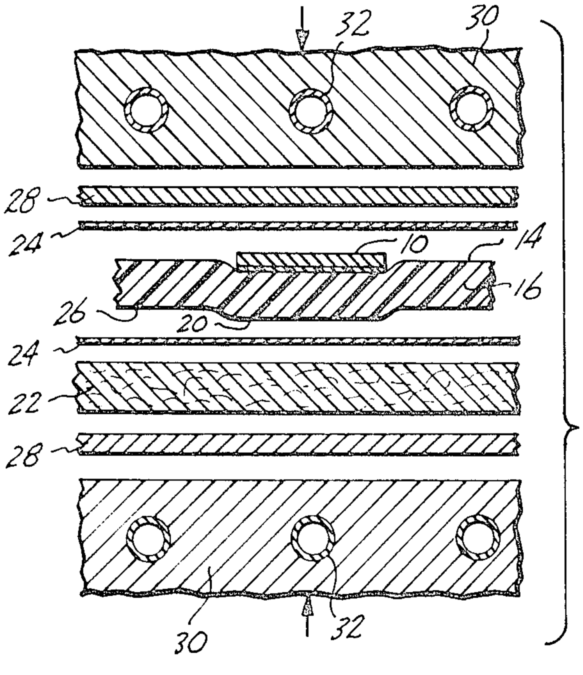
FIG. 6 is a schematic cross-sectional view of my press technique using the same board but with the layer of die material disposed back to back with the face of the board on the other side thereof.

To illustrate the process of my invention, I have used the structure 16, 10 of FIG. 2 in each of the embodiments in FIGS. 4 and 6. According to the process, the composite structure 16, 10 is arranged back to back in a stack with a 1/16-inch thick continuous uninterrupted layer of electrical press board 22, there being, however, a layer of 1 mil aluminum foil 24 interposed therebetween, to serve as a parting film. In the case of the FIG. 4 embodiment, the circuit-bearing face 14 of the composite structure is disposed opposite the board; in the case of the FIG. 6 embodiment, the other face 26 is so disposed. In both instances, the stack is sandwiched between a pair of 1/32-inch stainless steel plates 28, and in the embodiment of FIG. 6, a 1 mil aluminum foil parting film 24 is also interposed between the upper plate 28 and the composite structure 16, 10. The entire sandwich is inserted in a 60-ton hydraulic press comprised of a pair of heated platens 30, and the platens are closed to compress the stack while heat is applied thereto through the coils 32 of the platens. The applied pressure is a function of time, and the nature of the resinous base. Enough is employed to achieve the desired result without substantially laterally deforming the base. Typically the press is heated to 300° F., and the stack is compressed therein for 10 minutes.

Figure 5:
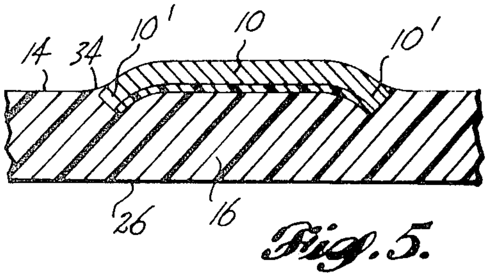
FIG. 5 is a cross-sectional view of the product resulting from the operation in FIG. 4.
Figure 7:
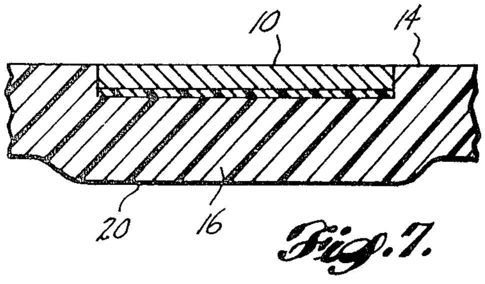
FIG. 7 is a cross-sectional view of the product resulting from the operation of FIG. 6.

In the case of the FIG. 4 embodiment, the resulting structure resembles that shown in FIG. 5 wherein it will be seen that the foil strips 10 are in a raised condition on the face 14 of the base, and have taken on a slightly convexly arcuate cross section at their outline edges 10'. In addition, a small bead or fillet 34 of the resin or adhesive overlaps each edge, and altogether the new characteristics of the face 14 present a smooth unbroken contour to the touch of a finger. The other face 26 of the base is flat. In the case of the FIG. 6 embodiment, the resulting structure resembles that seen in FIG. 7 wherein the strips 10 are entirely flat and impressed in the base substantially flush with the face 14 thereof, so that the face is continuously flat and smooth to the touch, without an interruption such as the trench 18 seen in FIGS. 2 and 3. The protrusions 20 remain at points opposite the foil. In the case of both embodiments, the base substantially retains its original dimensions and the process appears to be applicable to structures of various base sizes. I believe that the changed character of each structure results from the fact that the compactable electrical press board takes up the compression forces opposite the strips, allowing the base to deform at these points, without undergoing substantial lateral deformation in the portions thereof relatively surrounding the outline of the strips.

It will be understood, of course, that many changes and additions can be made in and to the invention without departing from the scope and spirit of the same as defined in the following claims.

I claim:

1. In the manufacture of composite structures such as printed circuit boards, the steps of stacking a composite structure comprised of a sheetlike base of cure-hardenable resinous material in a set condition and having a pattern of conductive metal strips bonded to a face thereof, back to back with a relatively yieldable backing in a press; applying a relatively rigid platen directly against the face of the composite structure on the opposite side thereof from the backing, compressing the stack in the press while applying heat thereto, displacing the base material underlying the strips relatively toward the backing, so as to flatten the face of the composite structure on the opposite side thereof from the backing, displacing the strips in relation to the base, so as to impart a smooth unbroken contour to the strip-bearing face of the structure, the backing being nonlaminable with the structure under the conditions of compression; and relatively removing the composite structure from the backing, after compressing the stack.

2. The method according to claim 1 wherein the backing is disposed back to back with the strip-bearing face of the base.

3. The method according to claim 1 wherein the backing is disposed back to back with the face of the base on the other side thereof from the strip-bearing face.

4. The method according to claim 1 wherein the backing is comprised of a Kraft pulp material.

5. The method according to claim 1 wherein the backing is comprised of a rubber material.

6. The method according to claim 1 wherein the temperature of the stack is elevated to about 250°–300° F.

7. The method according to claim 1 wherein a parting film is interposed between the backing and the composite structure.

8. In the manufacture of a composite structure such as a printed circuit board comprised of a pattern of metal foil strips bonded to a resinous base, the steps of arranging the composite structure in a stack in which the foil-bearing face of the base is back to back with a continuous uninterrupted layer of compressible die material, and compressing the stack between a pair of rigid platens while applying heat thereto, so as to cause the base to undergo compression in the portions thereof disposed relatively opposite the strips of foil, without undergoing substantial lateral deformation in the portions thereof relatively surrounding the outline of the strips, and thereby to displace the base and the pattern of strips in relation to one another so as to provide the foil-bearing face of the base with a smooth unbroken contour in which the foil strips are raised on the face of the base and have a slightly convexly arcuate cross section at their outline edges, the layer of die material being nonlaminable with the composite structure under the conditions of compression so that the die material and composite structure can be parted from one another thereafter.

9. In the manufacture of a composite structure such as a printed circuit board comprised of a pattern of metal foil strips bonded to a resinous base, the steps of arranging the composite structure in a stack in which the face of the base on the other side thereof from the foil-bearing face, is back to back with a continuous uninterrupted layer of compressible die material, compressing the stack between a pair of rigid platens while applying heat thereto, so as to cause the base to undergo compression in the portions thereof disposed relatively opposite the strips of foil, without undergoing substantial lateral deformation in the portions thereof relatively surrounding the outline of the strips, and thereby to displace the base and the pattern of strips in relation to one another so as to provide the foil-bearing face of the base with a smooth unbroken contour in which the strips are entirely flat and impressed in the base substantially flush with the face thereof, the layer of die material being nonlaminable with the composite structure under the conditions of compression, and relatively removing the layer of die material from the composite structure.

* * * * *